Patented May 26, 1953

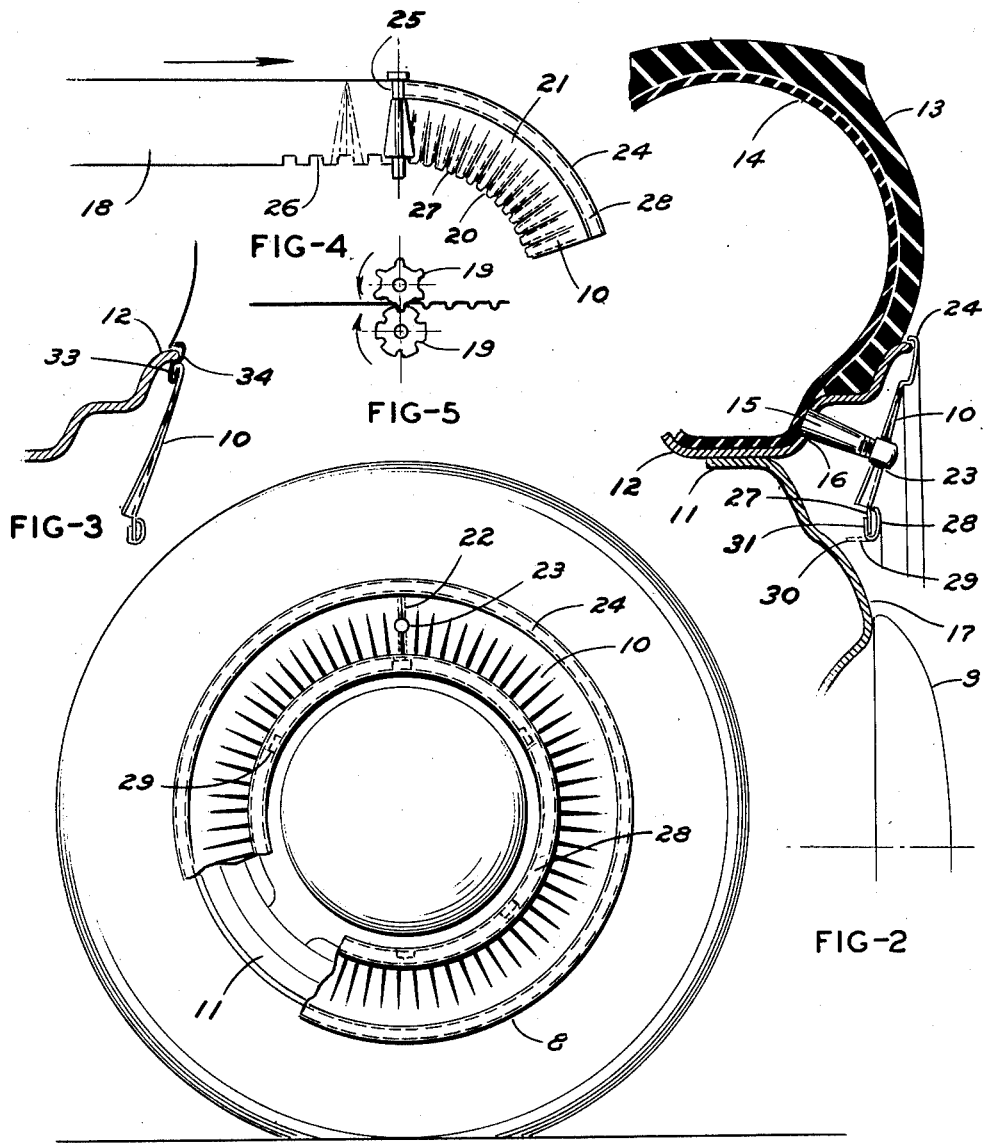

2,639,948

UNITED STATES PATENT OFFICE 2,639,948

VEHICLE WHEEL ORNAMENTAL TRIM RING CONSTRUCTION

Robert S. Grimshaw, Detroit, Mich.

Application September 10, 1947, Serial No. 773,095

4 Claims. (Cl. 301—37)

This invention relates generally to vehicle trim rings or covers, and in particular to ornamental wheel trim rings.

It is an object of this invention to provide a wheel trim ring which is removably attached to a vehicle wheel tire rim by any previously established means and made of any suitable material such as steel, aluminum, plastic, or the like, and in colors or bright finish to suit.

Another object is to provide a wheel trim ring which may be made from what is commonly referred to as strip stock, and which is usually readily available. In the case of some present wheel trim rings it is necessary to use a square sheet of material equal to the diameter of the wheel trim ring, in which case a large portion of the material from the center and corners is wasted. With this invention there is no waste of material.

Another object is to provide a wheel trim ring which forms novel wheel decorations in which the flutes as described later serve as an eye appeal medium by causing a myriad of brilliant reflections radially outward from the axis. In the case of chrome or bright metal finish the effect is distinctly novel and original.

Another object is to provide a wheel ring trim of thin material such as metal, plastic, or the like, in which the flutes serve as a radial stiffening means to the structure and allow for the use of lighter materials.

Another object is to provide a wheel trim of decorative effect which may be produced with a minimum of tool cost, the only tools needed being a small rotating fluter and assembly jigs as compared with the expensive stamping dies required to produce a drawn out or stamped ring.

Another object is to provide a wheel trim ring which is composed of a fluted strip stock as described herewith in combination with an annular trim bead which form a finish to the assembly.

Another object of my invention is to provide a bright finish wheel ring which tends to make the wheel look smaller due to the fact that the small trim band portion is more outstanding than the outer contour of the tire.

Another object of my invention is to provide a new and novel bright finish or color trim wheel ring in combination with the vehicle wheel hub cap in appearance, said hub cap which may or may not be mounted in my invention.

Other objects and advantages will become apparent during the course of the following description of the accompanying drawings wherein, Figure #1 is a direct side elevation showing the wheel trim ring assembly of the invention as applied to the vehicle wheel.

Figure #2 is a vertical section thru a vehicle wheel and tire and tire rim showing the wheel trim ring of Figure #1 as related to same.

Figure #3 is a vertical section thru a vehicle wheel and tire similar to Figure #2 but showing a variation of outer edge bead construction.

Figure #4 is a construction view showing manner in which the strip metal is processed thru rotating taper and fluted rollers to produce the invention described.

Figure #5 is an end view of the fluted rollers showing in general the manner in which the material of the inner circumference is gathered or fluted in along the inner circumference only.

Referring to the drawing in detail, Figure #1 shows the general intent and purpose of the invention and is generally designated 8, as applied to the standard vehicle wheel assembly, generally designated 11. The latter consists of a drop center tire rim 12, having a standard tire 13 mounted thereon, and containing a standard inflatable inner tube 14 having the usual valve stem 15 projecting thru the aperture 16 in rim 12. Rim 12 is mounted on wheel body portion 17 which in turn is rotatably attached upon a conventional axle (not shown). Hub cap 9 is shown for reference only and is normally independent of the trim ring but can be mounted in same if so desired.

Wheel trim ring main structural body 10 is formed of straight strip stock as shown at 18 in Figure #4, which in turn is processed thru ordinary fluting rollers 19, and in direction indicated by arrow. Rollers 19 are cone shaped in axial section and as shown in Figure #5 thus fluting or gathering in the material of the inner periphery of trim band 10 at 20 while the outer circumference 21 remains flat in edgewise section. In this manner a trim band is formed from strip stock having the inner periphery gathered in to a smaller circumference than the outer boundary and the resultant circular part having ends welded or lock seamed or such at 22. Lock seam 22 is preferably located at the aperture 23 which allows for the tire valve 15 to protrude thru trim ring 10, making seam practically invisible. An additional stiffening bead 24 as shown in Figures #1, 2, and 4, may be included in the rolling operation. This is further indicated on fluting rollers Figure #4 at 25. Flat stock 18 shown in Figure #4 may also be notched or serrated similarly to drawing along the inner edge as shown at 26, said projecting portions after the fluting operation to form a flat plane edgewise section as at 27, Figures #2 and 4. An inner and separate rolled finish bead is indicated at 28 in Figure #2 which has an outward convex surface or the like, and occasionally spaced tabs 29 shown in Figures #1 and 2 and said tabs projecting inwardly as shown at 30, is inserted into the opening of the inner periphery of the assembled structural body 10. After assembly of detail 28 to ring 10, tabs 29 are turned back against portion 27 and as shown at 31, thus locking finish bead 28 to ring 10 and forming a neat finish to the inner periphery of the completed assembly 8.

A modification of my invention is indicated in Figure #3 the main construction being basically as described heretofore with the exception of the outer flange 33 which is turned back against the main body structure 10 and thus locking a suitable flexible finish strip 34 in place, said finish strip to flexibly cover the edge of tire rim 12.

While I have shown and described my invention in detail, it is to be understood that the same is to be limited only by the appended claims, for many changes might be made without departing from the spirit and scope of my invention.

What I claim is:

1. An article of manufacture comprising an ornamental wheel trim ring structural assembly for attachment to a tire rim with a main valve stem, said ring being formed from a flat strip by means of a plurality of gathered or fluted sections on the inner periphery and inclined to the axis of the ring and diminishing outwardly to a flat surface on the outer periphery, resultant ends being joined together forming a continuously circular concave ring or disc with a valve stem opening at the joint.

2. An article of manufacture comprising an ornamental wheel trim ring structural assembly for attachment to a tire rim with a main valve stem, said ring being formed from a flat strip by means of a plurality of gathered or fluted sections on the inner periphery and inclined to the axis of the ring and diminishing outwardly to a flat surface and having attached thereto on the inner periphery a separate trim finish bead of suitable exterior section, said bead having a plurality of tabs extending inwardly and thence outwardly from the axis of the wheel and embracing the resultant flat sections between the flutes and locking the trim finish bead in assembly to the trim ring main body portion.

3. An article of manufacture comprising an ornamental wheel trim ring structural assembly for attachment to a tire rim with a main valve stem, said ring being formed from a flat strip by means of a plurality of gathered or fluted sections on the inner periphery and inclined to the axis of the ring and diminishing outwardly to a flat surface, said flat surface having the edge of its outer periphery bent back and inwardly toward the axis of the ring, embracing and locking a flexible bead section in assembly, said bead section extending radially beyond the outer periphery of the main trim ring.

4. An article of manufacture comprising an ornamental wheel trim ring structural assembly for attachment to a tire rim with a main valve stem, said ring being formed from a flat strip by means of a plurality of gathered or fluted sections on the inner periphery and inclined to the axis of the ring and diminishing outwardly to a flat surface, the edge of which is radially bounded by a U-shaped section, said U section having the open portion disposed inwardly from the outer surface of the ring.

ROBERT S. GRIMSHAW.

References Cited in the file of this patent

UNITED STATES PATENTS

| Number | Name | Date |
| --- | --- | --- |
| D. 143,498 | Lyon | Jan. 8, 1946 |
| 1,890,123 | Linn | Dec. 6, 1932 |
| 2,404,389 | Lyon | July 23, 1946 |
| 2,421,755 | Lyon | June 10, 1947 |
| 2,431,699 | Lyon | Dec. 2, 1947 |

FOREIGN PATENTS

| Number | Country | Date |
| --- | --- | --- |
| 512,736 | France | 1921 |